(12) United States Patent
Lanza

(10) Patent No.: US 8,316,592 B2
(45) Date of Patent: Nov. 27, 2012

(54) PROTECTIVE COVERING FOR ROOF MOUNTED SYSTEMS

(76) Inventor: Carlo John Lanza, Islip, NY (US)

(*) Notice: Subject to any disclaimer, the term of this patent is extended or adjusted under 35 U.S.C. 154(b) by 317 days.

(21) Appl. No.: 12/661,379

(22) Filed: Mar. 16, 2010

(65) Prior Publication Data

US 2010/0236155 A1 Sep. 23, 2010

Related U.S. Application Data

(60) Provisional application No. 61/210,639, filed on Mar. 21, 2009.

(51) Int. Cl.
*E04D 13/18* (2006.01)
*E04D 13/00* (2006.01)

(52) U.S. Cl. .............. 52/173.3; 52/24; 52/27; 52/58; 248/237

(58) Field of Classification Search .............. 52/24, 27, 52/173.3, 58–60, 62; 248/237, 300
See application file for complete search history.

(56) References Cited

U.S. PATENT DOCUMENTS

| | | | | |
|---|---|---|---|---|
| 853,897 | A * | 5/1907 | Porter | 52/24 |
| 917,167 | A * | 4/1909 | Shaw | 285/43 |
| 2,129,833 | A * | 9/1938 | Fradette | 52/24 |
| 2,300,842 | A * | 11/1942 | Leslie | 454/366 |
| 2,490,220 | A * | 12/1949 | Leslie | 454/366 |
| 2,551,223 | A * | 5/1951 | Schneider | 454/366 |
| 2,692,548 | A * | 10/1954 | Knorr | 454/366 |
| 3,579,930 | A * | 5/1971 | Murphy | 52/24 |
| 3,673,748 | A * | 7/1972 | Minialoff | 52/60 |
| 3,690,079 | A * | 9/1972 | Hemminger | 52/97 |
| 3,895,467 | A * | 7/1975 | Clement | 52/199 |
| 4,058,111 | A * | 11/1977 | Wendel | 126/570 |
| 4,102,090 | A * | 7/1978 | Anguish | 52/58 |
| 4,269,173 | A * | 5/1981 | Krueger et al. | 126/634 |
| 4,278,070 | A * | 7/1981 | Bowen | 126/704 |
| 4,291,684 | A * | 9/1981 | Werner et al. | 126/705 |

(Continued)

FOREIGN PATENT DOCUMENTS

EP 95455 A2 * 11/1983

(Continued)

OTHER PUBLICATIONS

Fain, Steve et. al "Pitched Roof Racking", Oct./Nov. 2008, pp. 72-76, 78 & 80, solarproffesionals.com.

*Primary Examiner* — Robert Canfield
*Assistant Examiner* — Charissa Ahmad
(74) *Attorney, Agent, or Firm* — Alfred M. Walker

(57) ABSTRACT

A protective covering helps to prevent fastener leaks from roof installed fasteners, which are used to mount roofing systems, such as a solar panel installation system, to roofs with a mounting bracket attached to the roof. The protective covering is a portion of flat, malleable waterproof material molded to form a cover, forming a triangular-shaped structure when viewed from the side. The triangular shaped structure includes a base and a hypotenuse portion where the line of the roof acts as a side which is covered by at least the hypotenuse portion. The hypotenuse portion meets the roof at an angle. The covering is adapted for insertion under portions of a roof shingle, and extends back in a slight rise (downwardly with respect to the roof) to cover the fastener and L-shaped bracket, which the fastener fastens to the roof.

11 Claims, 6 Drawing Sheets

U.S. PATENT DOCUMENTS

| | | | | |
|---|---|---|---|---|
| 4,296,740 A * | 10/1981 | Meckler | | 126/623 |
| 4,372,292 A * | 2/1983 | Ort | | 126/622 |
| 4,677,248 A * | 6/1987 | Lacey | | 136/244 |
| 5,027,576 A * | 7/1991 | Gustavsson | | 52/748.1 |
| 5,123,208 A * | 6/1992 | Kirby et al. | | 52/58 |
| 5,164,020 A | 11/1992 | Wagner | | |
| 5,590,495 A | 1/1997 | Bressler | | |
| 5,630,752 A * | 5/1997 | Gubash | | 454/366 |
| 5,743,063 A * | 4/1998 | Boozer | | 52/713 |
| 5,953,869 A * | 9/1999 | Balfour et al. | | 52/200 |
| 6,052,956 A * | 4/2000 | Hoy et al. | | 52/200 |
| 6,570,084 B2 * | 5/2003 | Dinwoodie | | 136/251 |
| 6,733,381 B1 * | 5/2004 | Ploeger | | 454/366 |
| 6,786,012 B2 | 9/2004 | Bradley | | |
| 6,959,517 B2 * | 11/2005 | Poddany et al. | | 52/173.3 |
| 7,260,918 B2 * | 8/2007 | Liebendorfer | | 52/173.3 |
| 7,857,269 B2 * | 12/2010 | Plaisted et al. | | 248/237 |
| 7,921,607 B2 * | 4/2011 | Thompson et al. | | 52/60 |
| 7,946,082 B2 * | 5/2011 | Ohkoshi et al. | | 52/173.3 |
| 8,177,180 B2 * | 5/2012 | Plaisted et al. | | 248/237 |
| 2002/0046506 A1 * | 4/2002 | Ullman | | 52/1 |
| 2002/0092246 A1 * | 7/2002 | Graham | | 52/126.1 |
| 2004/0140002 A1 * | 7/2004 | Brown et al. | | 136/251 |
| 2005/0115162 A1 * | 6/2005 | Nee | | 52/24 |
| 2006/0156648 A1 * | 7/2006 | Thompson et al. | | 52/173.3 |
| 2006/0266405 A1 * | 11/2006 | Lenox | | 136/244 |
| 2007/0251567 A1 * | 11/2007 | Plaisted | | 136/244 |
| 2008/0000173 A1 * | 1/2008 | Lenox et al. | | 52/173.1 |
| 2008/0190047 A1 * | 8/2008 | Allen | | 52/173.3 |
| 2009/0019796 A1 * | 1/2009 | Liebendorfer | | 52/173.3 |
| 2009/0114269 A1 * | 5/2009 | Fletcher et al. | | 136/251 |
| 2009/0320898 A1 * | 12/2009 | Gumm | | 136/245 |
| 2011/0067327 A1 * | 3/2011 | Eiffert et al. | | 52/173.3 |
| 2011/0174360 A1 * | 7/2011 | Plaisted et al. | | 136/248 |
| 2012/0023843 A1 * | 2/2012 | Stearns et al. | | 52/173.3 |

FOREIGN PATENT DOCUMENTS

GB 2215359 A * 9/1989

* cited by examiner

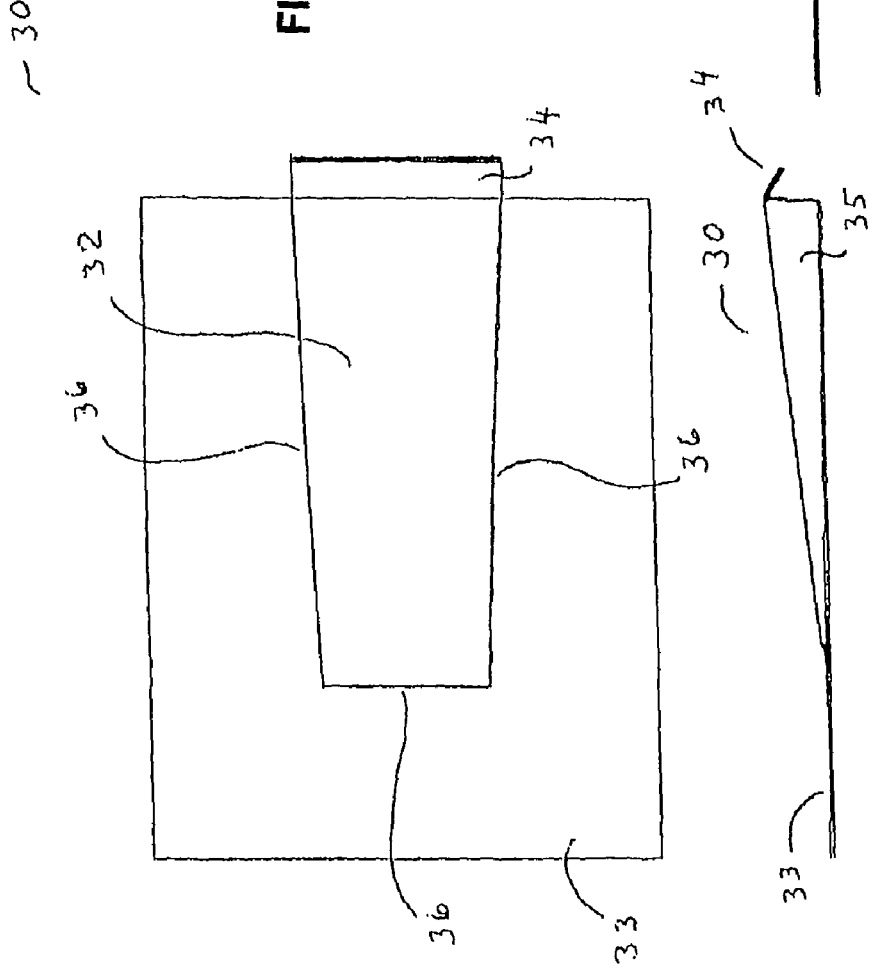

PROTECTIVE COVERING FOR ROOF MOUNTED SYSTEMS

RELATED APPLICATIONS

This application is based upon Provisional Application Ser. No. 61/210,639, filed Mar. 21, 2009, and claims priority and benefit therefrom under 35 U.S.C. §119(e). That application is incorporated by reference herein.

FIELD OF THE INVENTION

This application relates to protective covers for roof mounted systems which help prevent water entry.

BACKGROUND OF THE INVENTION

This invention broadly relates to residential roof mounted systems and, more particularly relates to a protective covering for helping to prevent water entry to structure-underlying roof locations at which the particular roof systems are fastened.

Various roof mounted systems are known. Examples without limitation include roof-mounted satellite antenna systems, roof-mounted solar water-heating systems, roof-mounted air cooling systems and roof-mounted solar panel systems, for example, photovoltaic mounting systems, sometimes referred to as photovoltaic (PV) racking systems. It is also known that building codes require securing PV racking systems securely to a pitched roof's underlying structural members, further requiring that multiple lag screws or through bolts penetrate the roofing material and sheathing in order to secure the PV racking system. Each associated hole is a potential entry point for water into the underlying structure for the entire life of the mounted PV racking system.

One common way of for securing roof-mounted apparatus', such as PV racking systems, to a roof is to mount the bracket to the roof at one end, by using a fastener such as an exposed lag screw or bolt, and attaching the bracket at its other end, or by attaching to an attaching point to the PV racking system. Brackets come in many shapes and sizes, for example, in a form of an L-bracket. While mounting a roof system with a bracket, such as an L-bracket, will generally include sealing the area around the exposed lag screw with a sealant such as waterproof caulking, such seals do not readily last for the life of the roof mounted system, and once installed and attached at the bracket, the roof mounted system will normally prevent access to reseal the mounting hole.

SUMMARY OF THE INVENTION

The present invention was developed to overcome the sealing difficulties of prior art roof mounting systems, such as, for example, solar panel installations, requiring roof fastener penetrations.

The invention comprises a novel protective cover over the roof for covering a fastener and part of an L-shaped bracket utilized on a roof, particularly a slanted roof, for securing a roof mounted system. The cover comprises a sheet of metal, or other malleable of molded material, formed as a triangular member, the narrow end of which may be inserted under a portion of a roofing shingle, and the rear end of which extends over the normally exposed fastener and part of an L-shaped bracket attaching the solar panel installation to the roof. The protective covering is a portion of flat, malleable waterproof material molded to form a cover preferably forming a triangular-shaped structure when viewed from the side. The triangular shaped structure includes a base and a hypotenuse where the line of the roof acts as a side which is covered by at least the hypotenuse, with the hypotenuse of the triangular structure meeting the roof at an angle. The triangular structure is adapted for insertion under a portion of a roof shingle, and extending back in a slight rise (downwardly with respect to the roof) to cover the exposed fastener and L-shaped bracket which the fastener fastens to the roof. An alternative embodiment of the cover may include tabs at all end portions.

The covers are installed and attached to brackets which are covered but for the part fastened to a rack frame for a solar panel installation.

Alternatively the covers may be installed, without any roof mounting system.

The cover covers the exposed L-bracket affixed to a portion of a roof via an exposed fastener. The cover may be maintained in place by sliding up under portions of the roofing shingles, and/or with an adhesive or sealant, e.g., silicone caulking. The cover should operate to help to prevent water seepage into the fastener opening as long as it remains fixed in place, regardless of the longevity of the sealant/adhesive.

BRIEF DESCRIPTION OF THE DRAWINGS

The present invention can best be understood in connection with the accompanying drawings. It is noted that the invention is not limited to the precise embodiments shown in drawings, in which:

FIG. 6 is a top view of an alternate embodiment of cover of this invention with a full flashing flange on all three sides, including the front edge.

FIG. 7 is a side elevation of the alternate embodiment.

FIG. 8 is a front elevation of the alternate embodiment.

DETAILED DESCRIPTION OF THE DRAWINGS

Figure 1:
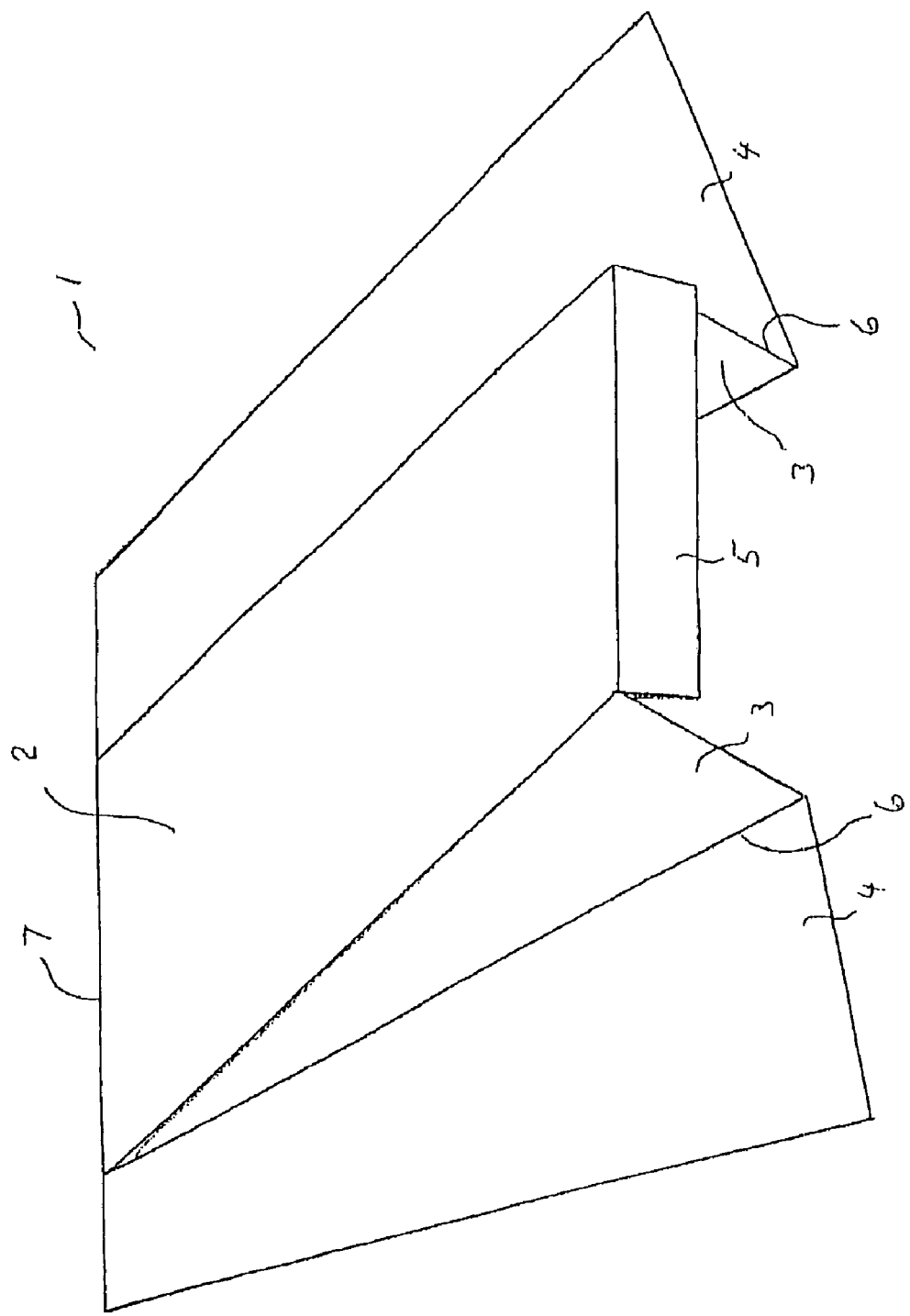
FIG. 1 is a perspective view of the cover of this invention.

FIG. 1 shows a protective cover 1 of this invention. Although many material choices and fabrication techniques are possible such as a variety of molded plastic materials, sheet metal (such as aluminum or copper) cut and folded or punch pressed into shape are preferred. Sloped surface 2 is supported by triangular sides 3. Flanges 4 on each side are designed to be fitted underneath the top and side portions of a shingle, which is cut to fit the contour of surface 2. Optional back edge 5 forms a drip edge and further shields the roof fastener. Edges 6 at the intersection of sides 3 and flanges 4 as well as the front edge 7 are preferably sealed against the shingle with appropriate sealant.

Figure 2:
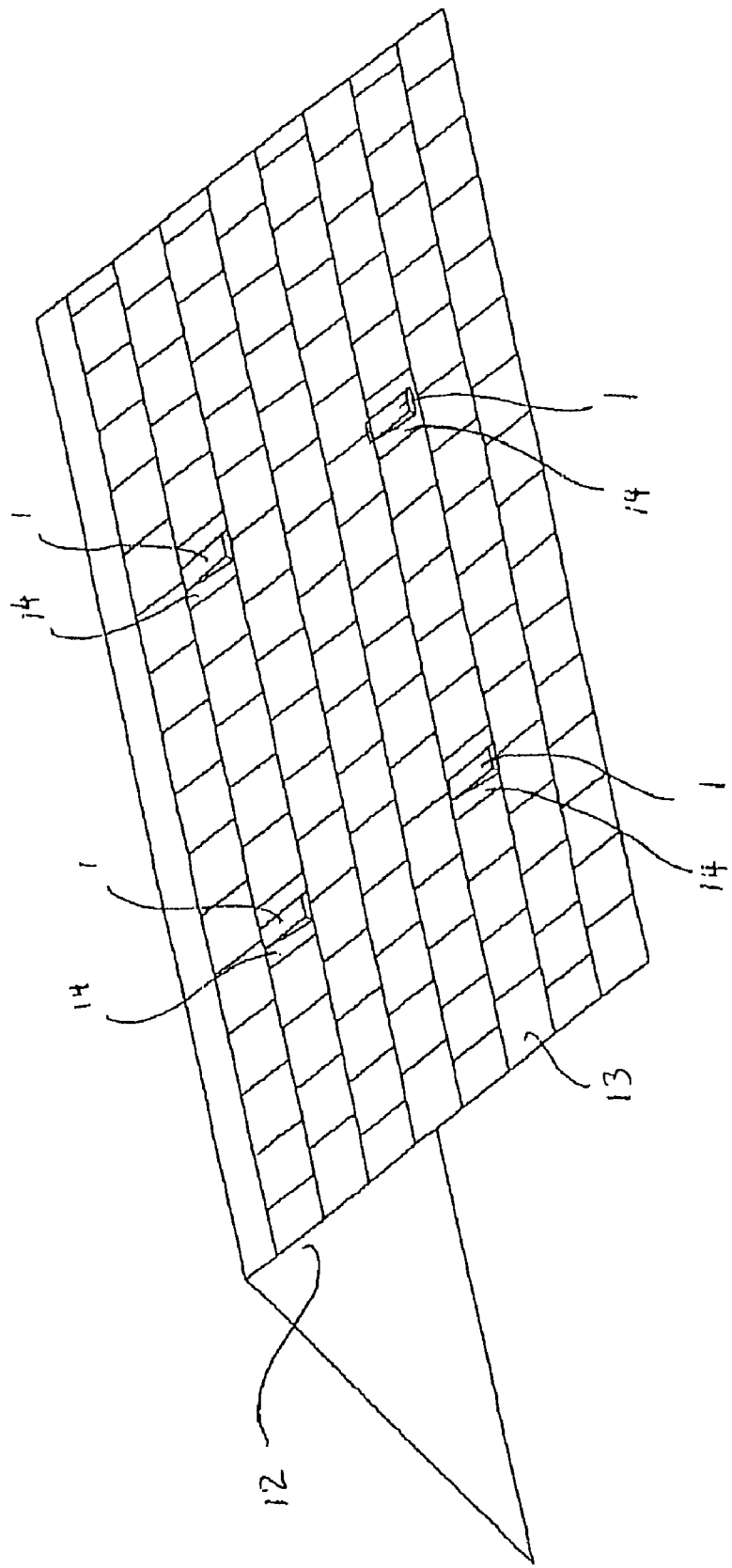
FIG. 2 is a perspective view of a pitched shingled roof with four of the covers of FIG. 1 spaced apart and installed over brackets for attachment to a solar collector.

FIG. 2 shows the placement of four covers 1 over mounting brackets for a solar collector on pitched roof 12. Note that the top layer of shingles 13 are cut around each cover 1 at the mounting sites 14.

Figure 3:
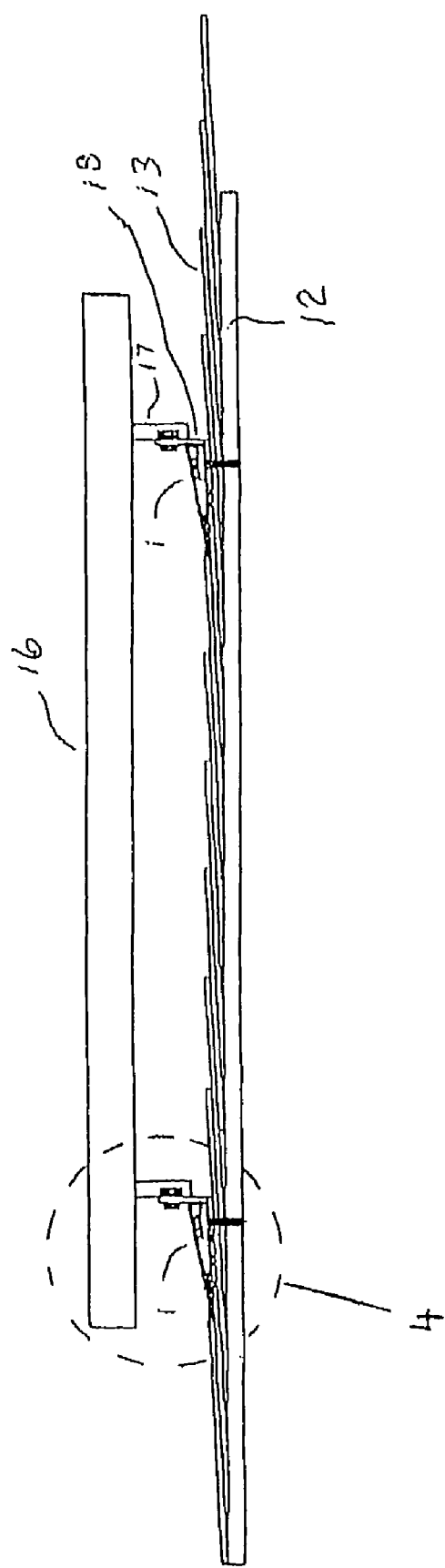
FIG. 3 is a side view showing the covers of FIG. 1 installed on a shingled roof as part of the attachment hardware of a solar collector.

FIG. 3 shows a side view of solar panel 16 mounted on roof 12 over shingles 13.

Figure 4:
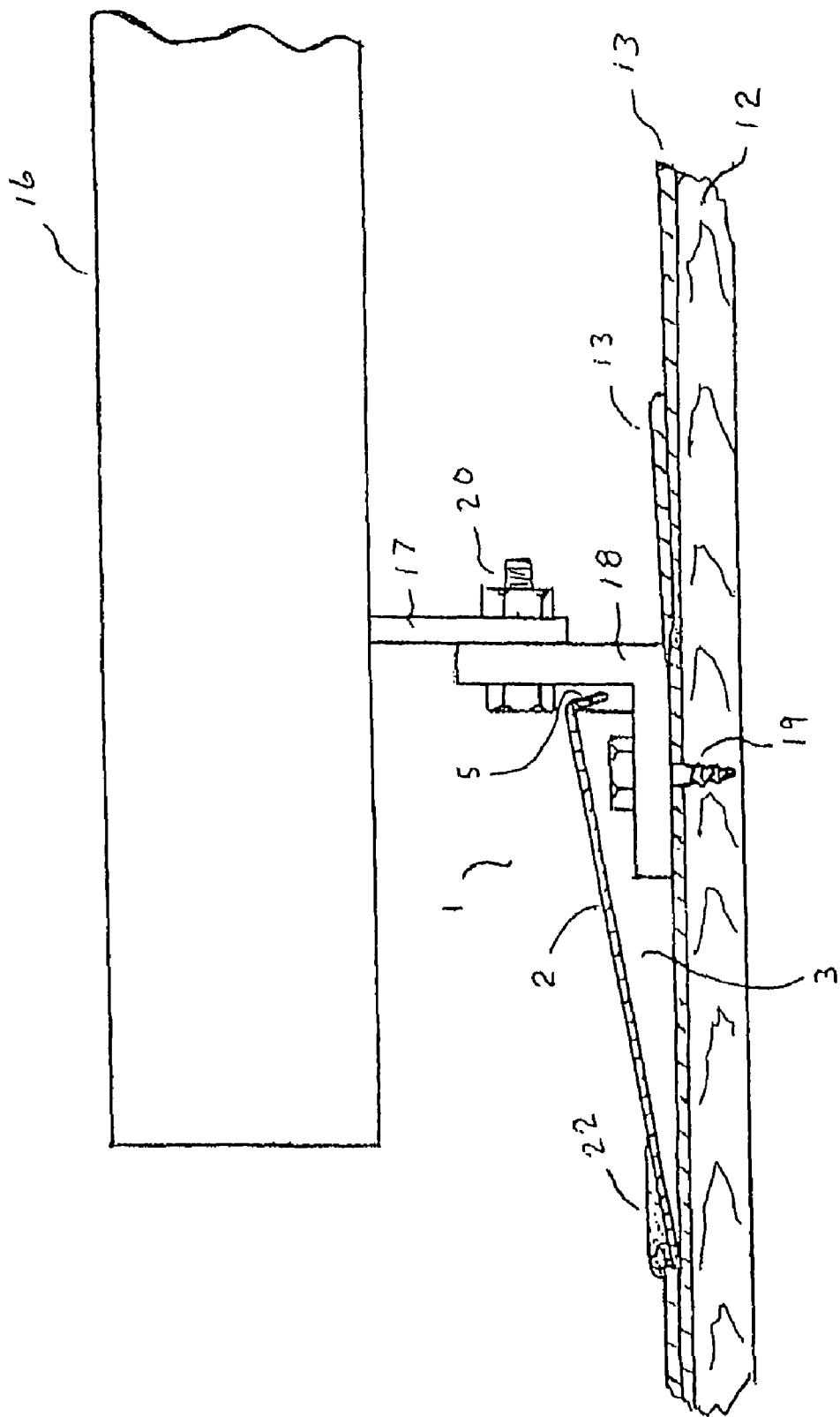
FIG. 4 is an enlarged side view detail of the cover of FIG. 1 (shown in crossection) protecting the bracket fastener installation of a solar collector.

The fastener area is enlarged in the detail shown in FIG. 4. L-bracket 18 is attached by lag bolt 19 to roof 12. Collector mounting bar 17 is attached via fastener 20 to bracket 18. Cover 1 (shown in crossection) covers the head of normally exposed fastener 19 which is now covered under sloped section 2. A small portion of sealant 22 is seen at the front end of cover 1.

Figure 5:
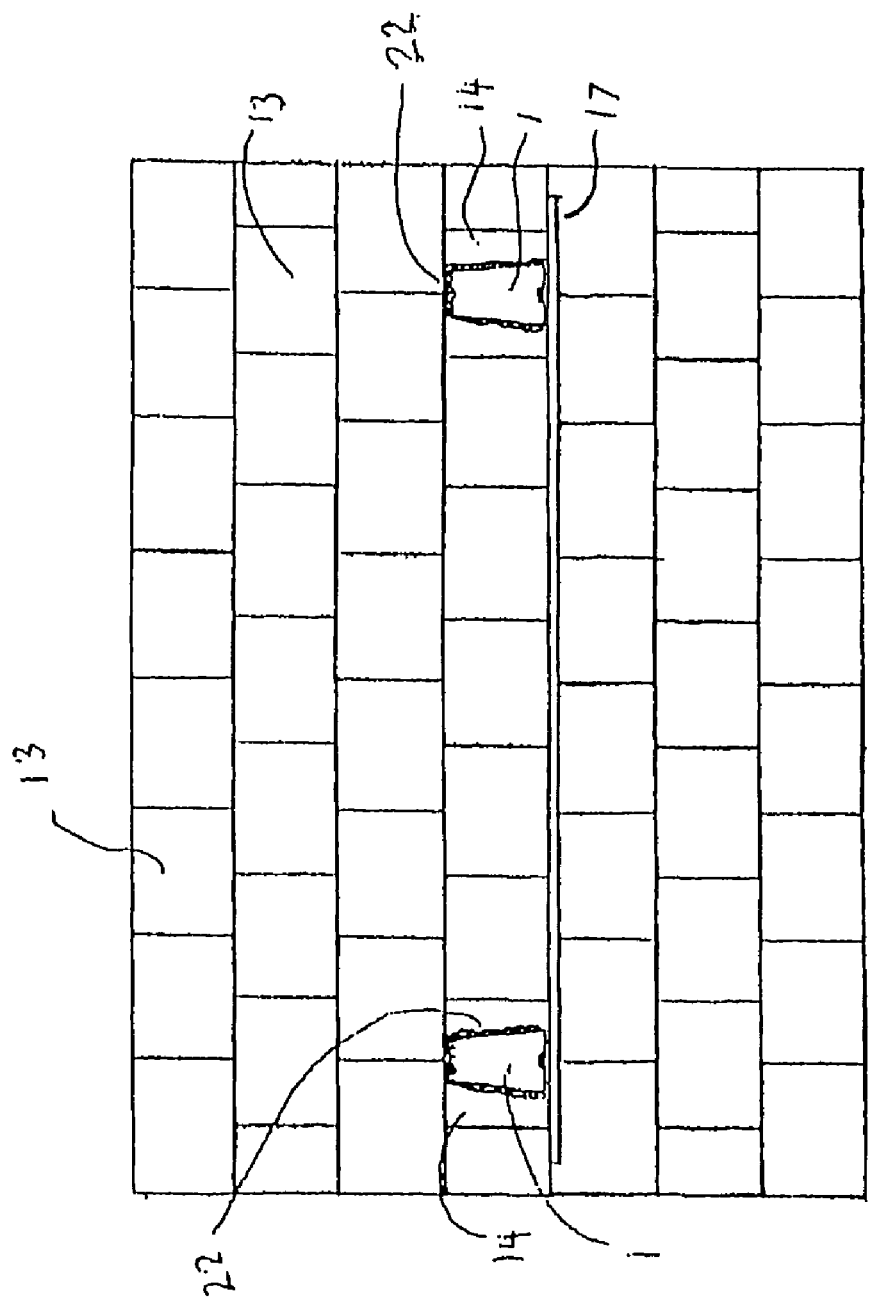
FIG. 5 is a detail top view of two covers installed on a shingled roof showing the use of sealant on three sides. (The solar collector is not shown in this view for clarity, although the fastening strip of the collector is shown.).

FIG. 5 shows a section of roof with two covers 1 installed inside the cut-away contour of top shingles 14 and sealed with a bead of sealant 22 on the front edge and both sides.

FIGS. 6-8 show a top side and front view respectively of an alternate embodiment of cover 30 of this invention. This cover has a continuous flashing flange 33 that surrounds the sloping area 32 on all three sides including the front. Optional back drip edge 34 serves the same function as edge 5 of cover 1. Contour 36, which is located at the interface of front of section 32 and sides 35 with flange 33; defines the location of sealant bead that would be applied to seal cover 30 with shingled surfaces.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

I claim:

1. A protective covering for, and in combination with, a roof-mounted system that is attached with a mounting bracket attached to a sloping roof using fasteners, comprising:
   a fastening member penetrating a shingle and underlining structure of said roof for attaching said mounting bracket to said roof;
   said roof-mounted system supported and spaced from said roof by a mounting member connected to said mounting bracket and said roof-mounted system;
   a portion of at least one shingle being cut away to accommodate said bracket mounted on said roof;
   a protective cover for enclosing said fastening member and at least a portion of said mounting bracket for preventing fastening leaks of water through said roof;
   said protective cover comprising a flat, malleable waterproof material molded to form a flat top surface extending from a flashing flange of said protective cover to a distal end of said protective cover and having triangular-shaped side walls;
   said flashing flange of said protective cover extending under a distal end of a shingle, said top surface extending out from said flashing flange in a slight rise, downwardly with respect to the roof to form said triangular-shaped side walls, said distal end of said protective cover covering the fastener and said portion of said bracket which the fastener fastens to the roof.

2. The combination of claim 1 in which said bracket is L-shaped, with said fastener extending through one leg of the L-shaped bracket into said underlying roof structure.

3. The combination of claim 2 in which said roof mounted system comprises a photovoltaic PV racking system.

4. The system of claim 1 in which said protected cover has a flap extending down from a distal edge of said protective cover forming a drip edge for providing further shielding of said fastener.

5. The system of claim 1 in which said flat top surface comprises front, rear, and side edges, said pair of triangular-shaped side wall extending down from said side edges of said protective cover from the rear edge of said flat top surface with an apex of each side wall at said rear edge of said flat top surface, and a pair of flanges extending out from bottom edges of said side walls.

6. The system of claim 1 having sealant on said distal end of the shingle for preventing water seepage under said protective cover.

7. The system of claim 1 in which multiple mounting brackets are mounted on more than one shingle to support said roof-mounted system.

8. The system of claim 1 in which said fastening member is a lag bolt.

9. The system of claim 1 in which said protective cover is of one piece construction.

10. The system of claim 1 in which said roof-mounted system comprises a solar panel.

11. A roof mounted solar panel system comprising:
   a sloped roof having an outer layer of overlapping shingles;
   a bracket assembly for supporting a solar panel above and spaced from said shingles whereby no part of said solar panel is in contact with any shingles on said roof;
   said bracket assembly attached to said roof through a first of said shingles;
   said bracket assembly comprising an L-shaped member with a first leg of said L-shaped member flush against an upper surface of said first shingle;
   a fastener extending through said first leg and said first shingle for securing said bracket assembly to said roof;
   a protective cover of single piece construction having a flat top surface with front, rear, and side edges, a pair of triangular shaped side walls extending down from said side edges from the rear edge of said flat top surface with an apex of each side wall at said rear edge of said flat top surface, and a pair of flanges extending out from bottom edges of said side walls;
   the rear edge of said flat top surface resting on the top surface of said first shingle adjacent an edge of a second, uphill shingle overlapping a rear, upper portion of said first shingle whereby said flat top surface slopes downwardly and away from the upper surface of said first shingle;
   said flanges extending under shingles adjacent side edges of said first shingle;
   the flat top surface of said protective cover extending over said first leg of said L-shaped bracket assembly covering said fastener and preventing water seepage on an about said fastener, and
   a mounting bar attached to and extending out from a second leg of said L-shaped bracket past a leading edge of said flat top surface for supporting said solar panel.

* * * * *